United States Patent [19]

Tick et al.

[11] Patent Number: 4,969,710
[45] Date of Patent: Nov. 13, 1990

[54] OPTICAL FIBER TRANSMISSION PATH WITH DISPERSION COMPENSATION

[75] Inventors: Paul A. Tick, Corning, N.Y.; Seiko Mitachi, Mito, Japan

[73] Assignee: Corning Incorporated, Corning, N.Y.

[21] Appl. No.: 333,635

[22] Filed: Apr. 5, 1989

[30] Foreign Application Priority Data

Apr. 8, 1988 [JP] Japan ................. 63-85153

[51] Int. Cl.$^5$ ............... G02B 6/10; G02B 6/00; G02B 5/20
[52] U.S. Cl. ............... 350/96.30; 350/96.34; 350/96.29; 252/582; 252/584
[58] Field of Search ............ 350/96.15, 96.29, 96.30, 350/96.34, 96.16; 252/582, 584, 587; 501/40, 904

[56]  References Cited

U.S. PATENT DOCUMENTS

| | | | |
|---|---|---|---|
| 3,997,241 | 12/1976 | Nishida et al. | 350/96.33 X |
| 4,261,639 | 4/1981 | Kogelnik et al. | 350/96.30 |
| 4,639,075 | 1/1987 | Salour et al. | 350/96.29 X |
| 4,685,107 | 8/1987 | Kafka et al. | 372/6 |
| 4,715,679 | 12/1987 | Bhagavatula | 350/96.33 |
| 4,723,828 | 2/1988 | Garel-Jones et al. | 350/96.29 |
| 4,752,593 | 6/1988 | Tick | 501/40 |
| 4,768,853 | 9/1988 | Bhagavatula | 350/96.15 |
| 4,784,465 | 11/1988 | Berkey | 350/96.30 |
| 4,877,304 | 10/1989 | Bhagavatula | 350/96.29 |

FOREIGN PATENT DOCUMENTS 60-121403  6/1985  Japan .................. 350/96.34 X

OTHER PUBLICATIONS

S. Mitachi, Society of Glass Technology Conf. on Infrared Transmitting Materials, Peebles, 6/12/86 Abstract "D".
Lam et al., "Dispersion Cancellation Using Optical-Fiber Filters", Optics Lett. vol. 7 No. 6 6/82 pp. 291-293.
Miya et al., "Ultimate Low-Loss Single-Mode Fibre at 1.55 $\mu$m", Elect. Lett. vol. 15 No. 4 2/79 pp. 106-108.
Sugimura et al., "Wavelength Dispersion Characteristic . . . ", IEEE J. of Quant. Elect. vol. QE-16 No. 2 2/80 pp. 215-224.
Cohen et al., "Tailoring Zero Chromatic Dispersion . . . ", Elect. Lett. vol. 15 No. 12 6/79 pp. 334-335.

Primary Examiner—Brian Healy
Attorney, Agent, or Firm—K. McNeill Taylor, Jr.

[57] ABSTRACT

An optical fiber transmission path wherein total dispersion of the system is compensated by use of fibers composed of glasses with total dispersion of opposite signs at the operating wavelength for the system. With silica-based fibers, $CdF_2$—$LiF$—$AlF_3$—$PbF_2$—$KF$—$YF_3$ fluoride glass-based fibers may be used for a system with 1.55 $\mu$m operating wavelength.

18 Claims, 3 Drawing Sheets

OPTICAL FIBER TRANSMISSION PATH WITH DISPERSION COMPENSATION

BACKGROUND OF THE INVENTION

This Invention relates to an optical fiber transmission path in which the effects of dispersion are minimized or compensated for.

Among conventional single mode optical fibers, fibers having specific refractive index difference 0.19% and core diameter 9.4 μm have been reported to achieve 0.2 dB/km low loss, close to the theoretical limit at wavelength 1.55 μm (T. Miya et al., Electron. Lett., 15 (1979) 106). However, the wavelength at which the total dispersion of this silica-based (hereinafter $SiO_2$-based) optical fiber will become zero is 1.32 μm. The total dispersion at the wavelength 1.55 μm, which provides the lowest loss value, is reported to be −1.7 ps/Å/km (A. Sugimura et al., IEEE. J. of QE, 16 (1980) 215). The realization of an ideal transmission medium with dispersion at wavelength 1.55 μm minimized is also discussed.

Material dispersion is inherent in the optical fiber material; therefore it is possible to control waveguide dispersion to shift the zero dispersion wavelength to a wavelength greater than 1.32 μm. Proposed solutions include making the relative refractive index difference between the ore and the clad larger, and achieving zero total dispersion over a wide range of wavelength by providing a W type refractive index distribution See, e.g., Nishida et al. U.S. Pat. No. 3,997,241. Additional structures for such "dispersion flattening" are disclosed in Bhagavatula, U.S. Pat. No. 4,715,679.

However, in these cases, a special waveguide structure has to be formed and problems, such as increase in scattering may occur. These are difficult to solve with special core designs. Recently, an approach is reported in which the relative refractive index difference of core-clad is increased by using a pure $SiO_2$ core and by doping fluorine in the clad. By using a pure $SiO_2$ core, the scattering is at kept low in an attempt to achieve a low loss, at the 0.2 dB/km level, in fibers having zero dispersion at 1.55 μm. According to recent reports (for example: Tanaka et al., National Conference Record 1987, Semiconductor Devices and Materials, The Inst. of Electronics Information & Communications Engineers (1987) p. 2–218; and, Tanaka et al., ibid., 430 (1987) p. 2–217), by providing a special waveguide structure, such as dual shape type or step added Gaussian type, etc., the zero dispersion can be shifted to 1.55 μm and 0.2 dB/km transmission loss can be achieved.

It has been suggested that a fluoride glass-based fiber made from BGZA matrix glass, connected to a $SiO_2$-based fiber, be used in order to accomplish dispersion compensation (Mitachi et al. Japanese Patent Publication 60-121403; S. Mitachi, Society of Glass Technology Conference on Infrared Transmitting Materials, Peebles, June 12, 1986, Abstract D; and, S. Mitachi, IECE Japan National Conference Record, Nov. 1–4, 1987, Kumamoto, Technical Paper P. 2–223). However, the transmission path disclosed in these publications requires relatively long lengths of fluoride glass optical fiber, which are difficult to fabricate, for this application, since the zero material dispersion wavelength of fibers made from BGZA matrix compositions is only in the range of 1.67–1.7 μm. The total dispersion at the preferred operating wavelength for minimum attenuation of the $SiO_2$-based fiber, 1.55 μm, is approximately 1 ps/Å/km. The typical zero material dispersion wavelength of silica-based optical fibers is approximately 1.3 μm whereas the preferred operating wavelength for minimum attenuation is approximately 1.55 μm, where silica-based single mode fiber has total dispersion of −1.6 ps/Å/km. Therefore, a 1.6 times longer fiber made from BGZA matrix compositions is necessary to compensate for the dispersion in $SiO_2$-based fibers at the 1.55 μm operating wavelength. For example, if $SiO_2$-based fibers of 10km length are used, BGZA fluoride fibers with 16km length are needed.

SUMMARY OF THE INVENTION

As described above, in order to shift the zero dispersion of a $SiO_2$-based single mode optical fiber to the 1.55 μm wavelength, a special waveguide structure must be provided. With the present technology it is very difficult to accurately shift the zero dispersion wavelength to an arbitrary, desired wavelength Therefore, it is an object of the present invention to set the zero dispersion wavelength of a transmission path accurately at an arbitrary, desired wavelength, simply and without a requirement for a special waveguide structure.

To achieve these and other objects, the present invention provides a new method of optical fiber dispersion compensation in which the zero dispersion wavelength can be simply and very accurately established at an arbitrary, desired wavelength within the wavelength range from 1.32 μm to 2 μm for $SiO_2$-based single mode optical fibers.

The present invention further provides a transmission path comprising a single mode $SiO_2$-based fiber (fiber length $L_1$) connected to a single mode fluoride glass-based optical fiber (fiber length $L_2$). By changing the fiber length relative value, $L_1/L_2$, of these two optical fibers, it is possible to set the zero dispersion wavelength at an arbitrary, desired wavelength, within the wavelength region from 1.32 μm to 2.0 μm, at which the total dispersion, i.e., the sum of the material dispersion and the waveguide dispersion of the transmitting line composed of $SiO_2$-based optical fiber and fluoride glass-based optical fiber, will become zero.

In accordance with one aspect of the present invention, a fluoride glass-based glass with zero material dispersion wavelength greater than 1.7 μm is used in order to minimize the length of fluoride glass-based fiber required for the transmission path. In accordance with a further aspect of the present invention, a fluoride glass-based glass with total dispersion greater than 1 ps/Å/km at 1.55mm is used in order to minimize the length of fluoride glass-based fiber required for the transmission path.

In accordance with another aspect of the present invention, the above described single mode fluoride glass-based optical fiber comprises a glass matrix specified by the composition formula, as calculated on a fluoride basis from the metal content of the glass: (20–32 mol%) $CdF_2$, (24–41.2 mol%) $AlF_3$, (24–41.2 mol%) $PbF_2$, (5–10 mol%) LiF, (0–7 mol%) KF, (0–8 mol%) $YF_3$, and (0–5 mol%) $LaF_3$ with oxygen (O) added in the range from 0.8 to 1.5 wt%.

DESCRIPTION OF THE PREFERRED EMBODIMENTS

Hitherto, in $SiO_2$-based single mode optical fiber, the waveguide structure might comprise a simple step index profile, a high N. A., a dual shape index profile, or a special waveguide structure such as step added Gaussian type to carry out zero dispersion wavelength shifting at low loss. By contrast, in the present invention, a fluoride glass-based single mode optical fiber is connected to the $SiO_2$-based single mode fiber to compensate for the dispersion. Additionally, in the present invention, it is preferable to use a fiber having a dispersion that is large and of opposite sign to the dispersion of $SiO_2$-based glass, namely to use a $CdF_2$—LiF—$AlF_3$—$PbF_2$ system single mode optical fiber with high dispersion compensation ability. approximately expressed by equation (1):

$$\Delta\tau = \Delta\tau^{(n)} + \Delta\tau^{(g)} + \Delta\tau^{(m)} \tag{1}$$

In a single mode optical fiber, since it is not necessary to consider the contribution of mode dispersion, the transmission bandwidth is limited by the material dispersion $\Delta\tau^{(n)}$ and the waveguide dispersion $\Delta\tau^{(g)}$.

The material dispersion is an inherent property of the material. The waveguide dispersion is mainly determined by the relative refractive index difference of the core, the clad and the core diameter, and the refractive index profile. Therefore, the total dispersion of single mode optical fiber may be obtained by measurement of the material dispersion and estimation of the waveguide dispersion.

Figure 7:
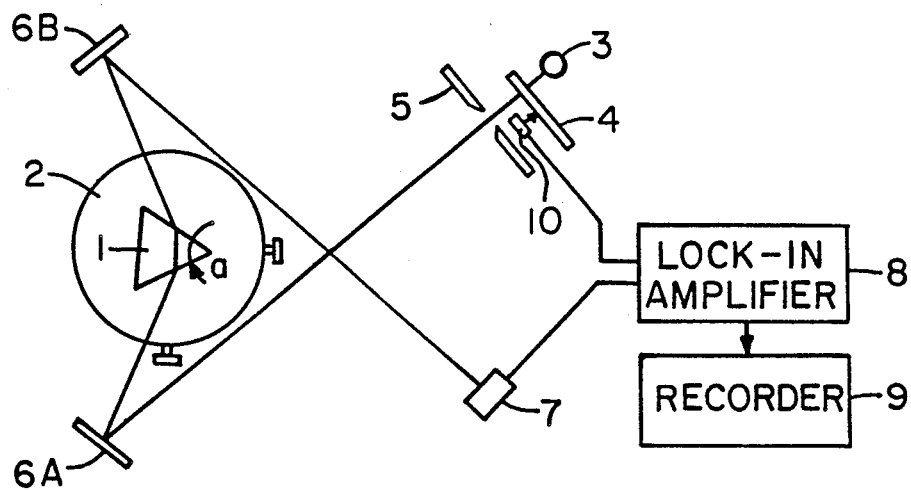
FIG. 7 depicts an optical system equipped with a precision spectroscope for measuring the material dispersion.

The material dispersion may be derived by measuring the refractive index dispersion, for example, by means of the dispersion measurement system using a precision spectroscope as shown in FIG. 7. In FIG. 7, 1 is the measurement specimen; 2 is the specimen platform; 3 is a light source; 4 is a light beam chopper; 5 is a slit; 6A and 6B are reflectance mirrors; 7 is the InSb light receiver; 8 is a lock-in amplifier; 9 is a recorder; 10 is a synchronous signal source for synchronously driving the light beam chopper 4 and the lock-in amplifier 8.

For the preparation of the measurement specimen, a 50 gram mixture composed of 14.0 mol% $CdF_2$, 10.0 mol% CdO, 30 mol% $AlF_3$, 30.5 mol% $PbF_2$, 5.0 mol% LiF, 4.0 mol% KF, and 6.5 mol% $YF_3$, was melted in a platinum crucible at 950° C. over a period of 15 minutes and cast into a mold to obtain a glass block. In this case the oxygen concentration was 1.09 wt%. This glass system is further described in Tick U.S. Pat. No. 4,752,593, which is incorporated herein by reference. The measurement specimen was annealed in the vicinity of the glass transition temperature, 260° C., for one day (24 hours) and then cut into a regular triangle prism. The five surfaces were optically ground and employed as a measurement specimen.

In the arrangement depicted in FIG. 7, the prepared measurement specimen (prism) 1 was placed on the specimen platform 2. The Hg/He line spectra from the light source 3, as well as the specific absorption lines of trichlorobenzene and polystyrene, were employed to measure the refractive indices at 22 wavelengths, in the range from 0.4 to 4.3 μm, as shown in Table 1, by using the minimum deviation method. The light, chopped with a light beam chopper 4 which is driven by the synchronous signal from the synchronous signal light source 10, passes through slit 5, resulting in a vertical line spectrum. This vertical line spectrum enters the prism 1 and is refracted and is then guided into the InSb light detector 7 by the reflectance mirror 6B and converted into an electrical signal. The electrical signal is amplified by the lock-in amplifier 8 which is synchronously driven by the signal from the synchronous signal source 10. The signal from the amplifier 8, corresponding to each wavelength measured, is recorded on the recorder 9 while the specimen platform 2 is microrotated in a certain angle. The refractive index is calculated from the prism vertical angle α and the minimum deviation δ of each wavelength spectral line, by the following equation:

$$v = \frac{\sin\frac{1}{2}(\delta + \alpha)}{\sin\frac{1}{2}\alpha} \tag{2}$$

The minimum deviation and the obtained refractive index are shown in Table 1. (Significant figures are given to five decimal places.)

TABLE 1

| The Measured Refractive Indices at Various Wavelengths | | | |
|---|---|---|---|
| Wavelength (μm) | Light Source | Minimum Deviation | Refractive Index |
| 0.435835 | Hg | 47° 42′ 35″ | 1.6149936 |
| 0.4471 | He | 47° 29′ 37″ | 1.6127662 |
| 0.5015 | He | 46° 41′ 21″ | 1.6044247 |
| 0.546074 | Hg | 46° 14′ 6″ | 1.5996804 |
| 0.576959 | Hg | 45° 58′ 39″ | 1.5969793 |
| 0.587561 | He | 45° 53′ 57″ | 1.596156 |
| 0.667815 | He | 45° 26′ 14″ | 1.5912858 |
| 0.706519 | He | 45° 16′ 16″ | 1.5895282 |
| 1.01398 | Hg | 44° 33′ 26″ | 1.5819367 |
| 1.08297 | He | 44° 27′ 31″ | 1.5808832 |
| 1.12866 | Hg | 44° 24′ 20″ | 1.5803159 |
| 1.3622 | Hg | 44° 11′ 4″ | 1.5779481 |
| 2.1526 | TCB | 43° 39′ 11″ | 1.572233 |
| 2.4374 | TCB | 43° 28′ 53″ | 1.570380 |
| 2.6569 | TCB | 43° 21′ 57″ | 1.5691307 |
| 3.2389 | TCB | 42° 51′ 43″ | 1.5636634 |
| 3.3036 | Poly | 42° 48′ 51″ | 1.563143 |
| 3.4199 | Poly | 42° 41′ 40″ | 1.561839 |
| 3.5524 | TCB | 42° 34′ 50″ | 1.560597 |
| 3.7077 | TCB | 42° 25′ 43″ | 1.558937 |
| 3.9788 | TCB | 42° 9′ 1″ | 1.555890 |
| 4.258 | $CO_2$ | 41° 41′ 18″ | 1.5508125 |

TCB: Trichlorobenzene
Poly: Polystyrene

These refractive index data are used to approximate the refractive index dispersion curve by the polynominal (pentanominal) equation (3) shown below. Each of the five coefficients, A–E, were obtained by using the least squares method from the refractive index data set forth in Table 1.

$$n(\lambda) = A\lambda^{-4} + B\lambda^{-2} + C + D\lambda^2 - E\lambda^4 \quad (3)$$

Here, $\lambda$ is wavelength; $n(\lambda)$ is the refractive index of each wavelength.

Corresponding to the refractive data shown in Table 1, the coefficients, A-E, obtained by the above method, are summarized in Table 2.

TABLE 2

| Coefficients A-E Obtained by Least Squares Method | |
|---|---|
| A | $1.759515506 \times 10^{-4}$ |
| B | 0.006413213589 |
| C | 0.0764974570943 |
| D | $-0.00105544929103$ |
| E | $-2.010702565 \times 10^{-5}$ |

Figure 2:
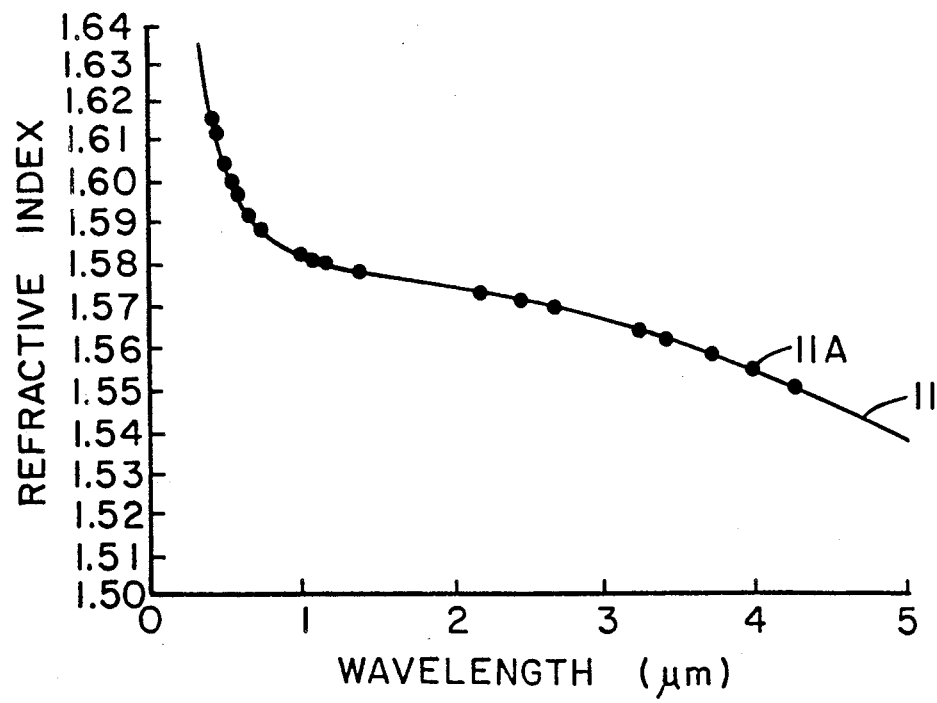
FIG. 2 depicts the refractive index dispersion curve of $CdF_2$—LiF—$AlF_3$—$PbF_2$—KF—$YF_3$ system fluoride glass.

The refractive index dispersion curve, for the glass specimen composed of 14.0% $CdF_2$, 10.0% CdO, 30% $AlF_3$, 30.5% $PbF_2$, 5.0% LiF, 4.0% KF and 6.5 $YF_3$ (mol%), obtained by inserting the above coefficients into equation (3), is shown in FIG. 2. The measured data in Table 1 were also plotted in FIG. 2. In FIG. 2, 11 is the refractive index dispersion curve and 11A are the measured values. According to FIG. 2, the wavelength dependency of the measured refractive index is well expressed by equation (3) and the obtained coefficients, A-E, in Table 2.

The coefficients, A-E, were inserted into equation (4) below to obtain the material dispersion $M(\lambda)$.

$$M(\lambda) = \frac{\lambda}{C} \times \frac{d^2 n(\lambda)}{d\lambda^2} \quad (4)$$

$$= \frac{\lambda}{C} \left( \frac{10A}{\lambda^5} + \frac{3B}{\lambda^3} + D\lambda + 6E\lambda^3 \right)$$

Figure 3:
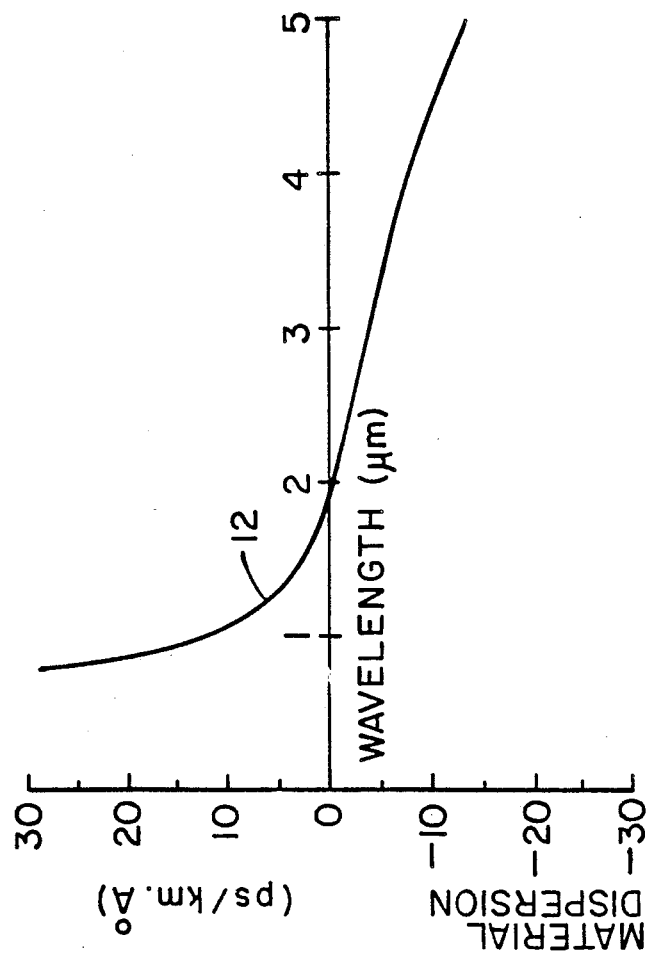
FIG. 3 depicts the material dispersion curve of the $CdF_2$—LiF—$AlF_3$—$PbF_2$—KF—$YF_3$ system fluoride glass.

From equation 4, the material dispersion $\Delta\tau^{(n)}$ ($=M(\lambda)$) shown in equation (1) was obtained. The results are shown in FIG. 3, Here, 12 indicates the material dispersion curve.

Next, the waveguide dispersion $\Delta\tau^{(g)}$ was calculated, using equation 5 below, which was derived by Gloge (D. Gloge, Appl. Opt., 10 (1971) 2442).

$$\Delta\tau^{(g)} = \frac{\Delta N_1 V}{C\lambda} \cdot \frac{d^2}{dV^2} [V(1 - x)] \quad (5)$$

$$V = aK (n_1^2 - n_2^2)^{\frac{1}{2}}$$
$$u = a (K^2 n_1^2 - \beta^2)^{\frac{1}{2}}$$

$$x = \frac{u^2}{V^2} \quad (0 \leq x \leq 1)$$

$$\Delta = \frac{n_1^2 - n_2^2}{2n_1^2}$$

$$N_1 = n_1 + K \frac{dn_1}{dK}$$

$$K = \frac{2\pi}{\lambda}$$

Figure 4:
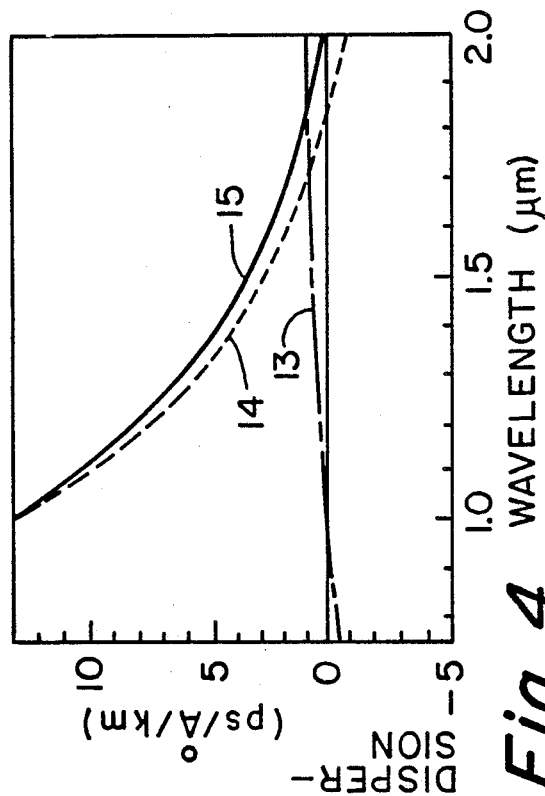
FIG. 4 gives the characteristic diagram showing the total dispersion curve of the $CdF_2$—LiF—AlF—$PbF_2$—KF—$YF_3$ system fluoride glass.

$n_1$: refractive index of the core glass
$n_1$: refractive index of the clad glass
$a$: core diameter
$\lambda$: wavelength of light
$C$: speed of light in vacuum
$V$: normalized frequency -continued
$\beta$: propagation constant
$\Delta$: relative refractive index difference Using equation (5), the waveguide dispersion for a single mode fiber of the glass used in the measurement specimen was calculated by assuming a refractive index of the core glass equal to 1.5780, the refractive index of the clad glass equal to 1.5748, a core radius of 9.2 $\mu$m, and a specific refractive index difference of 0.2%. The waveguide dispersion curve 13 thus obtained is shown in FIG. 4. In FIG. 4, the aforementioned material dispersion curve 14 and the total dispersion curve 15, namely the sum of the waveguide dispersion 13 and the material dispersion 14, are shown.

Figure 5:
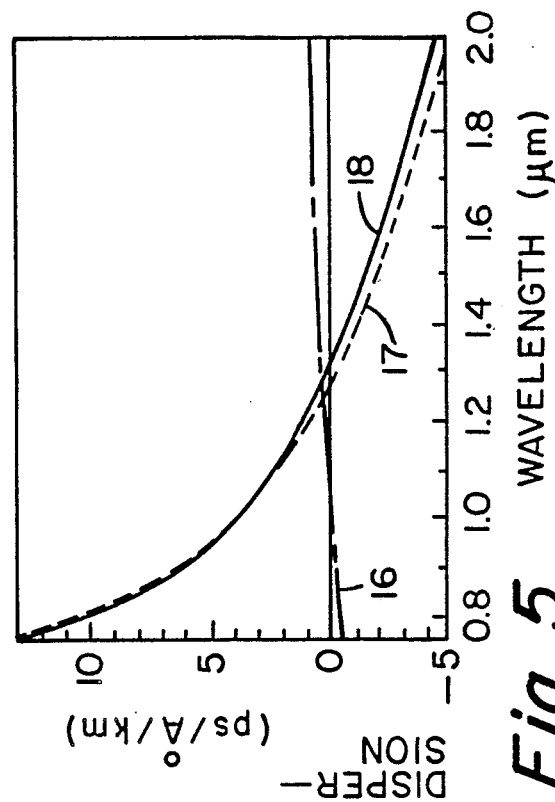
FIG. 5 gives the characteristic diagram showing the total dispersion curve of a $SiO_2$-based single mode optical fiber.

Further, as shown in FIG. 5, the waveguide dispersion curve 16 was calculated for the $SiO_2$-based single mode optical fiber by assuming a core glass refractive index of 1.4612 ($n_D$), a clad glass refractive index of 1.4584 ($n_D$), and the relative refractive index difference equal to 0.19%. The material dispersion curve 17 obtained from the actually measured refractive index dispersion curve, and the total dispersion curve 18, the sum of the above two dispersions, are also shown in FIG. 5.

The wavelengths at which the total dispersion equals zero are 1.32 $\mu$m for the $SiO_2$-based single mode optical fiber and 2.0 $\mu$m for the fluoride glass-based optical fiber.

As indicated in FIG. 4 and FIG. 5, within the wavelength range from 1.32 $\mu$m to 2.0 $\mu$m, since the signs of the total dispersion of the two fibers are opposite, the dispersions can be mutually compensated by connecting predetermined lengths of the two optical fibers. In the present invention, a dispersion compensated communication path is constructed by connecting the single mode fluoride glass-based optical fiber and the single mode $SiO_2$-based optical fiber.

Figure 6:
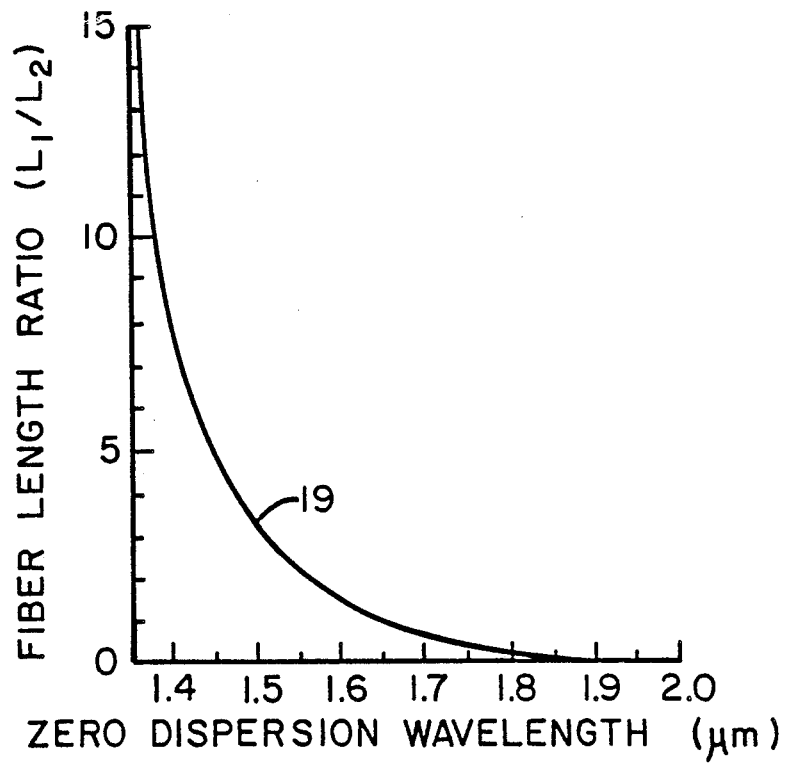
FIG. 6 shows the relationship between the fiber length ratio of the $SiO_2$-based optical fiber over the $CdF_2$—LiF—$AlF_3$—$PbF_2$—KF—$YF_3$ system fluoride optical fiber, and the zero total dispersion wavelength.

FIG. 6 shows the relationship between the $L_1/L_2$ ratio (the $SiO_2$-based optical fiber length $L_1$ over the fluoride glass-based optical fiber length $L_2$), and the wavelength at which the total dispersion will become zero in the dispersion compensated communication path of the present invention (i.e., the fiber length ratio versus zero dispersion wavelength characteristic curve 19). As shown in FIG. 6, by changing the fiber length ration $L_1/L_2$ of the two fibers, zero dispersion can be shifted to any arbitrary, desired wavelength. Furthermore, in the present invention, if the wavelength dependency curves of the total dispersion of the single mode fluoride glass-based optical fiber and the single mode $SiO_2$-based optical fiber are already known, as shown in FIG. 4 and FIG. 5, then by changing the fiber length ration $L_1/L_2$ in minute increments, the zero dispersion wavelength can be precisely matched with the wavelength of the source being used.

Figure 1:
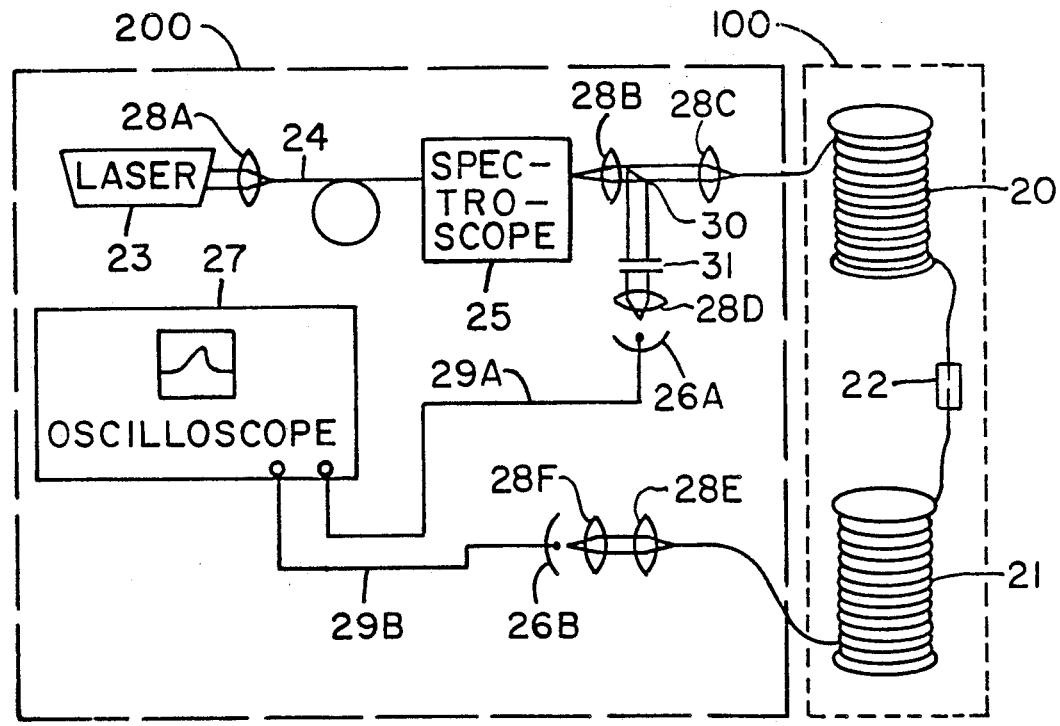
FIG. 1 depicts the dispersion compensated transmission path of the present invention together with precision correction equipment.

An example of a dispersion compensated communication path based on the present invention, including precision correction equipment, is depicted in FIG. 1. In FIG. 1, 20 is a $SiO_2$-based single mode optical fiber; 21 is a fluoride glass-based single mode optical fiber. The two optical fibers are connected by a fiber connector 22. The dispersion compensation portion 100, the principal portion of the present invention, is composed of the three parts, 20, 21 and 22. In this example, the precision correction portion 200 described below is attached to the communication path.

In the precision correction portion 200, 23 is a Nd-YAG laser; 24 is a single mode optical fiber; 25 is a diffraction grating type spectroscope; 26A and 26B are Ge-APD light (photo) detectors; 27 is a sampling oscilloscope; 28A, 28B, 28C, 28D, 28E and 28F are lenses; 29A and 29B are lead lines; 30 is a half mirror; and 31 is a light extinction apparatus.

The operation of the dispersion compensated communication path of the present example is as follows: The excited light from the Nd-YAG laser 23 (wavelength 1.064 μm) is introduced into the single mode $GeO_2$ doped core optical fiber 24, whose length ($L_1$) is 1-2 km, through lens 28A. The Raman light generated from the optical fiber 24 is introduced into the diffraction grating type spectroscope 25 and here, the light is separated into individual wavelengths and condensed by lens 28B. It is then introduced into the $SiO_2$-based single mode optical fiber (the fiber to be corrected) through half mirror 30 and lens 28C.

Simultaneously, the reference light separated by the half mirror 30 is detected by the Ge-APD light detector 26A through the light extinction apparatus 31 and lens 28D. The detected signal is sent to the sampling oscilloscope 27 via the lead line 29A.

Meanwhile, the light transported to the $SiO_2$-based optical fiber 20 is transmitted to the fluoride optical fiber 21 by the fiber connector 22 and it is then condensed and detected by the Ge-APD light detector 26B through lenses 28E and 28F. The detected signal is provided to the sampling oscilloscope 27 by the lead line 29B.

Simultaneously, the Nd-YAG laser 23 is mode locked by the 100 MHz frequency and Q switched using a 1 KHz repetition frequency to produce a pulse oscillation of 2 kilowatt peak output. The delay time required for each wavelength of the pulse light to pass through the two optical fibers 20 and 21 is measured on the oscilloscope 27 with this method.

The time difference between the reference light pulse received by the Ge-APD light detector 26A and the pulse received by the Ge-APD light detector 26B, after passing through optical fibers 20 and 21, is the delay time $\tau$. The reference light pulse width, t, is spread by the dispersion present in the optical fibers 20 and 21 to become t', and (t'- t) is the group delay time $\Delta\tau$. Using the measurement system shown in FIG. 1, both the reference light pulse and the light pulse that has passed through optical fibers 20 and 21 are detected; when $\Delta\tau \approx 0$, that particular wavelength is the zero dispersion wavelength.

The design of the dispersion compensation communication path using the precision correction portion 200 shown in FIG. 1 is as follows: From the specified zero dispersion wavelength $\lambda_o$ (for example, 1.550 μm) and the fiber length $L_1$ (for example, 1 km) of the $SiO_2$-based single mode optical fiber, the fiber length $L_2$ (for example, 0.454 km) of the fluoride glass-based single mode optical fiber 21 is determined using the fiber length ratio-zero dispersion wavelength characteristic curve in FIG. 6. Both optical fibers, 20 and 21, having the defined lengths, are set on the dispersion compensation portion 100 shown in FIG. 1.

Next, the end of optical fiber 20 is aligned to the incident light from lens 28C, and the emitting end of the optical fiber 21 is adjusted so that the pulse wave on the oscilloscope 27 is maximized.

Under this condition, the wavelength is scanned by the spectroscope 25 to obtain the zero dispersion wavelength ($\lambda$). When $\lambda$ is shorter than the specified desired zero dispersion wavelength ($\lambda_o$), the appropriate length of the $SiO_2$-based optical fiber 20 is cut off as determined from FIG. 6. Conversely, when $\lambda$ is longer than $\lambda_o$, the appropriate fiber length, calculated from FIG. 6, is cut from the fluoride glass-based optical fiber 21 and $\lambda$ is measured again. By repeating this procedure, $\lambda$ can be set to $\lambda_o$ with a precision of ±0.001 μm.

The composition of fluoride glass-based optical fiber 21, as described above, 14.0 mol% $CdF_2$, 10.0 mol% CdO, 30 mol% $AlF_3$, 30.5 mol% $PbF_2$, 5.0 mol% LiF, 4.0 mol% KF and 6.5 mol% $YF_3$ may be employed as an example as follows: in the core glass, the KF amount is increased and the LiF amount is decreased, and in the clad glass, the LiF amount is increased and the KF amount is decreased to create a refractive index difference for forming a waveguide structure. In an alternative example, exchanging $PbF_2$ and $AlF_3$ will alter refractive index, and may be used in similar fashion to create a core and a cladding.

Oxygen may be conveniently introduced into the glass described above by partially replacing $CdF_2$ with CdO on a mole-for-mole basis. This does not change the cadmium concentration in the glass, and therefore the proportion of $CdF_2$ remains unchanged, as calculated or analyzed on a fluoride basis from the cadmium content of the glass. The $CdF_2$ range set forth below, i.e. (20-32) mol%, reflects the total cadmium content from both oxide and fluoride sources, but the weight % of the added oxygen may be added as a stoichiometric replacement for the fluoride of other metal components of the glass.

In the present invention, the composition which will provide a stable fluoride optical fiber glass is as follows, as calculated on a fluoride basis from the metal content of the glass: the composition ranges are 20-32 mol% $CdF_2$, 24-41.2 mol% $AlF_3$, 24-41.2 mol% $PbF_2$, 5-10 mol% LiF, 0-7 mol% KF and 0-8 mol% $YF_3$ with oxygen added in weight % in the range from 0.8 to 1.5 wt%.

For creating a refractive index difference, another approach, such as the addition of $LaF_3$ in 0 to 5 mol% range to the aforementioned glass may also be used to adjust the difference. By the addition of $LaF_3$, the glass stability will be increased.

In these composition ranges, similar to the curve 14 in FIG. 4, the glass material dispersion curves will show the opposite sign of the $SiO_2$-based material dispersion curve at wavelengths shorter than 2 μm; thus their total dispersion curves can compensate for the total dispersion of $SiO_2$. Compared to other fluoride glass compositions, these fluoride glass compositions possess zero material dispersion at longer wavelengths (1.9 μm). For instance, the material dispersion zero wavelength of a glass comprising a $ZrF_4$—$BaF_2$—$GdF_3$—$AlF_3$ system is in the vicinity of 1.67 to 1.7 μm (S. Mitachi and T. Miyashita, Appl. Opt., 22 (1983) 2419).

Furthermore, the material dispersions of these preferred fluoride glass compositions are larger than that of $ZrF_4$ system fiber by 2 to 3 times at wavelengths shorter than 2.0 μm. Therefore, a relatively short fiber will be sufficient to compensate for the dispersion of $SiO_2$-based single mode optical fiber. That factor makes the $CdF_2$—LiF—$AlF_3$—$PbF_2$—KF—$YF_3$—$LaF_3$ system glass a very effective optical fiber glass composition for used in the dispersion compensation installation of the present invention.

As described above, according to the optical fiber dispersion compensated transmission path of the present invention, the $SiO_2$-based single mode optical fiber is connected to a fluoride glass-based single mode optical fiber such as a $CdF_2$—LiF—$AlF_3$—$PbF_2$-based single mode optical fiber and by changing the fiber length ratio of the two optical fibers, the zero dispersion wavelength of the total transmission system can be very easily and precisely set at any desired wavelength, within the range from 1.32 μm to 2.0 μm. Therefore, in optical fiber transmission, the present invention makes it possible to set the zero dispersion for a simple step type waveguide structure single mode optical fiber at 1.55 μm, the minimum loss region, to achieve a low dispersion and low loss long distance optical transmission path.

Furthermore, in the dispersion compensated transmission path of the present invention, a relatively short length fluoride glass-based optical fiber will be sufficient to accomplish the dispersion compensation. By increasing the fiber length, dispersion may be compensated in an even longer $SiO_2$-based single mode optical fiber.

The above described embodiments are merely illustrative of the present invention. It will be apparent that numerous variations and modifications of the above described invention are within the scope of the appended claims.

We claim:

1. An optical fiber transmission path with dispersion compensation, comprising a first optical fiber with negative total dispersion at a predetermined operating wavelength connected to a second optical fiber with positive total dispersion at said operating wavelength, wherein the relative value of the lengths of said first and said second optical fibers are adjusted so that the combined dispersion of said transmission path is approximately zero at said operating wavelength, and wherein said second optical fiber comprises a glass with a zero material dispersion wavelength greater than 1.7 μm, whereby a relatively short length of said second optical fiber may be used.

2. An optical fiber transmission path with dispersion compensation, comprising a first optical fiber with negative total dispersion at a predetermined operating wavelength connected to a second optical fiber with positive total dispersion at said operating wavelength, wherein the relative value of the lengths of said first and said second optical fibers are adjusted so that the combined dispersion of said transmission path is approximately zero at said operating wavelength, and wherein said second optical fiber comprises a fluoride glass-based single-mode optical fiber formed of a glass with a zero material dispersion wavelength greater than 1.7 μm, whereby a relatively short length of said second optical fiber may be used.

3. The optical fiber transmission path of claim 2, wherein said second optical fiber comprises a glass matrix composition, calculated on a fluoride basis from the metal content of the glass, of 20–32 mol% $CdF_2$, 24–41.2 mol% $AlF_3$, 24–41.2 mol% $PbF_2$, 5–10 mol% LiF, 0–7 mol% KF, 0–8 mol% $YF_3$, and 0–5 mol% $LaF_3$, with oxygen added in the range of from 0.8 to 1.5 mol%.

4. The optical fiber transmission path of claim 3, wherein said glass matrix composition comprises 14.0 mol% $CdF_2$, 10.0 mol% CdO, 30 mol% $AlF_3$, 30.5 mol% $PbF_2$, 5.0 mol% LiF, 4.0 mol% KF, and 6.5 mol% $YF_3$.

5. The optical fiber transmission path of claim 3, wherein said first fiber comprises a silica based single mode optical fiber.

6. An optical fiber transmission path with dispersion compensation, comprising a first optical fiber with negative total dispersion at a predetermined operating wavelength in the range of from 1.3 μm to 2.0 μm, said first fiber being connected to a second optical fiber with positive total dispersion at said operating wavelength, wherein the relative value of the lengths of said first and said second optical fibers are adjusted so that the combined dispersion of said transmission path is approximately zero at said operating wavelength, and wherein said second optical fiber comprises a glass with a zero material dispersion wavelength greater than 1.7 μm, whereby a relatively short length of said second optical fiber may be used.

7. The optical fiber transmission path of claim 6, wherein said predetermined operating wavelength is approximately 1.55 μm.

8. An optical fiber transmission path with dispersion compensation, comprising a first optical fiber with negative total dispersion at a predetermined operating wavelength connected to a second optical fiber with positive total dispersion at said operating wavelength, wherein said positive total dispersion of said second optical fiber is greater than 1 ps/Å/km at said operating wavelength, whereby a relatively short length of said second optical fiber may be used in said transmission path.

9. The optical fiber transmission path of claim 8, wherein said second optical fiber comprises a glass matrix composition, calculated on a fluoride basis from the metal content of the glass, of 20–32 mol% $CdF_2$, 24–41.2 mol% $AlF_3$, 24–41.2 mol% $PbF_2$, 5–10 mol% LiF, 0–7 mol% KF, 0–8 mol% $YF_3$, and 0–5 mol% $LaF_3$, with oxygen added in the range of from 0.8 to 1.5 mol%.

10. The optical fiber transmission path of claim 8, wherein the relative value of the lengths of said first and said second optical fibers are adjusted so that the combined dispersion of said transmission path is approximately zero at said operating wavelength.

11. The optical fiber transmission path of claim 10, wherein said predetermined operating wavelength is in the range of from 1.3 μm to 2.0 μm.

12. The optical fiber transmission path of claim 11, wherein said predetermined operating wavelength is approximately 1.55 μm.

13. An optical fiber transmission path with dispersion compensation, comprising a first silica-based optical fiber connected to a second fluoride glass-based optical fiber, wherein said second optical fiber comprises a glass matrix composition, calculated on a fluoride basis from the metal content of the glass, of 20–32 mol% $CdF_2$, 24–41.2 mol% $AlF_3$, 24–41.2 mol% $PbF_2$, 5–10 mol% LiF, 0–7 mol% KF, 0–8 mol% $YF_3$, and 0–5 mol% $LaF_3$, with oxygen added in the range of from 0.8 to 1.5 mol%.

14. The optical fiber transmission path of claim 13, wherein said first optical fiber has a negative total dispersion at a predetermined operating wavelength, and said second optical fiber has a positive total dispersion at said operating wavelength, and wherein the relative value of the lengths of said first and said second optical fibers are adjusted so that the combined dispersion of said transmission path is approximately zero at said operating wavelength.

15. The transmission path of claim 13, wherein said glass matrix composition comprises 14.0 mol% $CdF_2$, 10.0 mol% CdO, 30 mol% AlF$_3$, 30.5 mol% PbF$_2$, 5.0 mol% LiF, 4.0 mol% KF, and 6.5 mol% YF$_3$.

16. The transmission path of claim 14, wherein said predetermined operating wavelength is in the range of from 1.3 μm to 2.0 μm.

17. The transmission path of claim 16, wherein said predetermined operating wavelength is approximately 1.55 μm.

18. The optical fiber transmission path of claim 1, wherein said first and second optical fibers are simple step waveguide structures.

* * * * *